United States Patent [19]

Schneider

[11] 4,111,468

[45] * Sep. 5, 1978

[54] HYDRAULIC BORING DEVICE

[76] Inventor: Michael Schneider, 1120 S. Union Ave., Alliance, Ohio 44601

[*] Notice: The portion of the term of this patent subsequent to Jun. 4, 1991, has been disclaimed.

[21] Appl. No.: 761,459

[22] Filed: Jan. 21, 1977

Related U.S. Application Data

[63] Continuation-in-part of Ser. No. 636,593, Dec. 1, 1975, abandoned.

[51] Int. Cl.² ............................................. F16L 27/00
[52] U.S. Cl. ..................................... 285/190; 285/281
[58] Field of Search ............... 285/190, 136, 280, 281; 173/57

[56] References Cited

U.S. PATENT DOCUMENTS

| 1,100,416 | 6/1914 | Barger | 285/136 |
|---|---|---|---|
| 1,532,774 | 4/1925 | Page | 285/190 |
| 2,328,898 | 9/1943 | Goff et al. | 285/190 X |
| 3,210,099 | 10/1965 | Franck | 285/190 |
| 3,492,025 | 1/1970 | Holland | 285/190 X |
| 3,814,193 | 6/1974 | Schneider | 285/190 X |
| 3,829,134 | 8/1974 | Hutchison | 285/190 X |

FOREIGN PATENT DOCUMENTS 1,473,213  2/1967  France ..................................... 285/190

Primary Examiner—George H. Krizmanich
Attorney, Agent, or Firm—Webster B. Harpman

[57] ABSTRACT

A boring device is disclosed wherein a boring bit is rotated as it is advanced and supplied with water through a hollow interior to facilitate the boring operation. A rotary connection introduces water into the hollow boring bit and its support means from one side thereof through an apertured sphere secured to and revolving with the support means.

4 Claims, 4 Drawing Figures

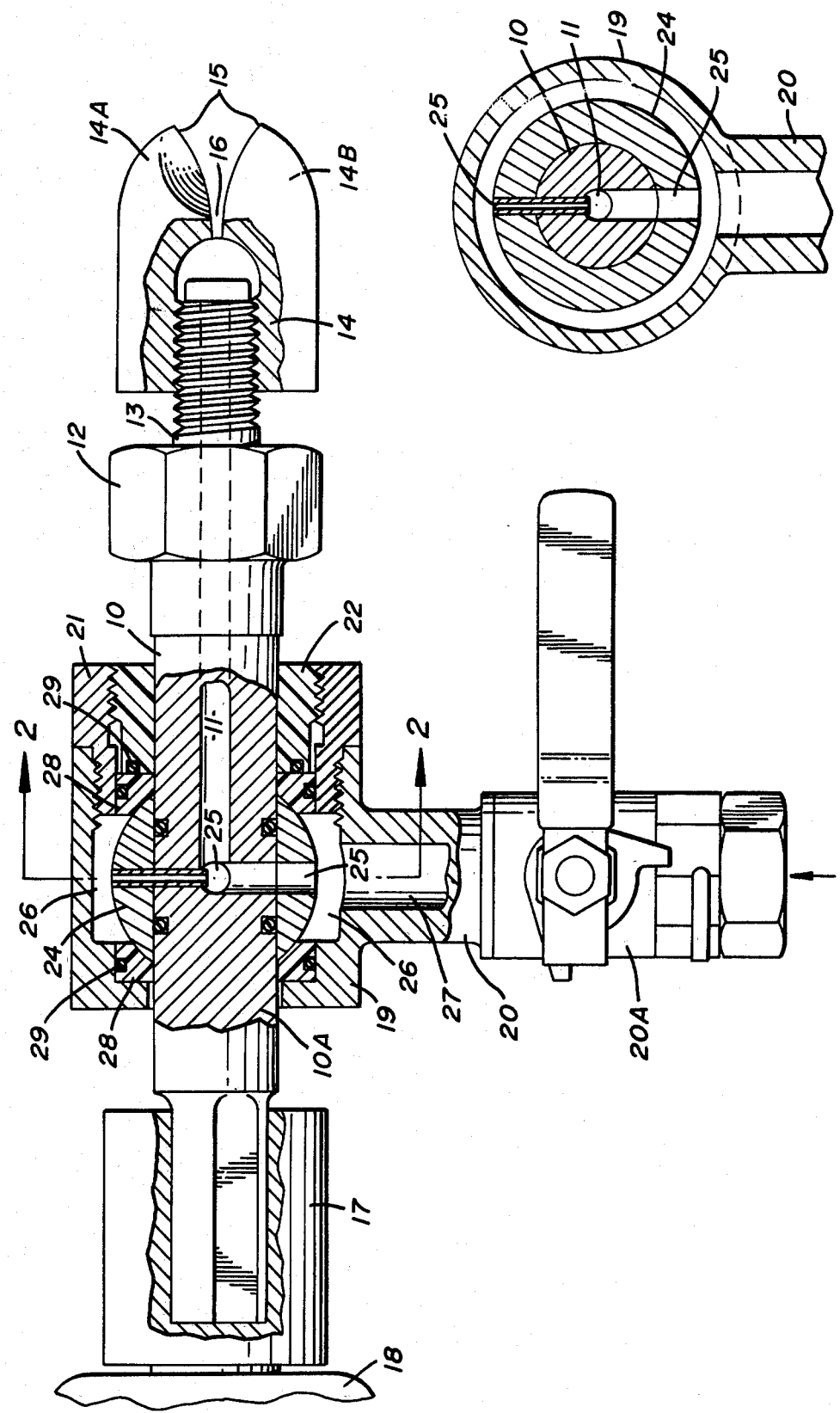

HYDRAULIC BORING DEVICE

This is a Continuation-In-Part of application Ser. No. 636,593, filed Dec. 1, 1975, now abandoned.

BACKGROUND OF THE INVENTION (1) Field of the Invention

This invention relates to boring devices of the type normally used to bore holes for pipes between spaced locations and wherein water is directed to the boring bit.

(2) Description of the Prior Art

Prior structures of this type usually employ openings in the side of a hollow drill rod to establish a communication passageway for water introduced into the same, such as U.S. Pat. No. 3,204,707. This invention forms a sphere about the point of introduction of the water into the drill rod and provides seals and bearings with respect thereto which permit the introduction of high pressure water and avoid the leakage thereof as heretofore common. This is an improvement over the device of my U.S. Pat. No. 3,814,193 of June 4, 1974.

SUMMARY OF THE INVENTION

A hydraulic boring device including a boring bit and extensible support means therefor in the form of a hollow drill rod are arranged to be rotated by a heavy duty electric drill, a chuck of which is secured to one end of the drill rod. Intermediate the drill rod ends, water is introduced through a housing carrying bushings defining a spherical chamber engaged on an apertured sphere secured to the hollow drill rod and comunicating therewith. Water is introduced into the housing and the housing and the extension through which the water is introduced provide a means of holding and guiding and moving the hollow drill rod which forms the support means for the boring bit.

The lightweight easily portable structure may be operated in a ditch or a pit from which a bored opening is being driven to a distant location.

DESCRIPTION OF THE DRAWINGS

FIG. 1 is a side elevation with parts broken away and parts in cross section illustrating the hydraulic boring device.

FIG. 2 is a vertical section on line 2—2 of FIG. 1,

DESCRIPTION OF THE PREFERRED EMBODIMENT

Figure 3:
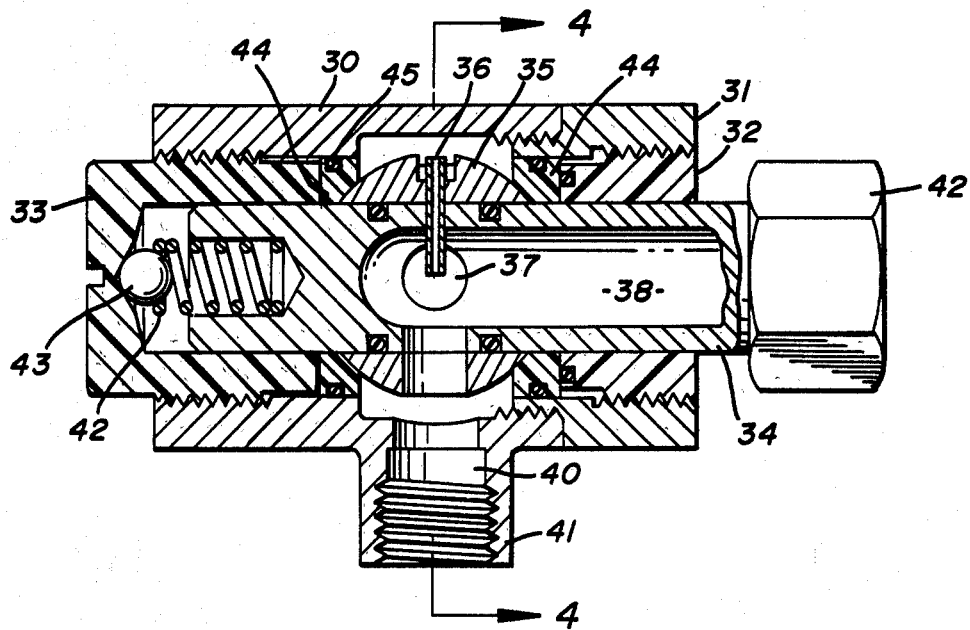
FIG. 3 is a side elevation with parts broken away and parts in cross section showing a modification.

As illustrated in the drawings, the hydraulic boring device comprises a drill rod 10 the majority of which is hollow and defines an elongated water conveying chamber 11. A pipe coupling 12 is secured to one end of the drill rod 10 to receive and support and revolve sections of pipe 13 to the outermost end of which a boring bit 14 is threadably engaged. The boring bit 14 includes a pair of oppositely disposed flat hardened metal members 14A and 14B respectively, the outermost ends of which are curved to form a pair of spaced points 15 and the boring bit 14 is apertured as at 16 so that water from the hollow drill rod 10 can be delivered to the sharpened pointed ends 15 of the boring bit 14.

An intermediate section of the drill rod 10 is solid and indicated by the numeral 10A in the drawings and the opposite end of the drill rod is adapted to be received and retained in a chuck 17 of an electric drill 18 or the like so that revolving motion can be imparted to the drill rod 10 thereby.

Intermediate the ends of the drill rod 10 a housing 19 is positioned thereabout and includes a depending handle like member 20 which is hollow and which serves as a means of introducing water into the interior of the housing 19. A valve 20A is attached thereto.

A cap 21 is threadably engaged in one end of the housing 19 and a sealing sleeve 22 of slippery plastic engaged therein.

An apertured sphere 24, the apertures being indicated at 25, is secured to the drill rod 10 and located within the housing 19. The apertures 25 are radially formed in the sphere 24 and communicate with the chamber 11 formed in the hollow drill rod 10. An annular channel 26 is formed in the housing 19 and the outer ends of the radially positioned apertures 25 in the sphere 24 are in registry therewith. The handle portion 20 of the housing 19 has an axial passageway 27 therein which communicates with the annular channel 26 so that water introduced into the passageway 27 will flow by way of the annular channel 26 through the apertures 25 in the sphere 24 into the chamber 11 in the drill rod 10 and thence outwardly and through the orifice 16 heretofore referred to.

In order that a water tight seal may be formed about the sphere 24 in the housing 19, a pair of oppositely disposed seals 28 preferably formed of slippery plastic material such as Teflon are provided for a relatively wide area contact with the sphere 24. The seals 28, as seen in FIG. 1 of the drawings, are sealed with respect to the inner surface of the cap 21 by O-rings 29. The tension of the seals 28 relative to the sphere 24 is controlled by the relative position of the sleeve 22 with respect to the cap 21. The seals 28 also act as bearings between the sphere 24, the drill rod 10, the cap 21 and the housing 19. The sleeve 22 also acts as a bearing between the drill rod 10 and the cap 21.

By referring now to FIG. 2 of the drawings, it will be seen that the housing 19 is preferably circular in cross section and that the annular chamber 26 extends around the interior thereof and that the radial apertures 25 in the sphere 24 communicate with the chamber 11 which defines the hollow interior of the drill rod 10.

It will thus be seen that when the hydraulic boring device is positioned in the chuck 17 of the suitable electric drill 18, the drill rod 10 may be effectively rotated thereby so that the boring bit 14 will be revolved whether or not additional sections of pipe 13 are positioned between the drill rod 10 and the boring bit 14 as will be understood by those skilled in the art.

A source of water supply is then connected with the handle like portion 20 and water under suitable pressure is introduced into the device and conveyed to the boring bit 14 where it is discharged.

In operating the device it is moved into the material such as earth in which the opening is being bored and the pipe coupling 12 permits periodic stops so that additional sections of pipe can be inserted as the boring continues.

Figure 4:
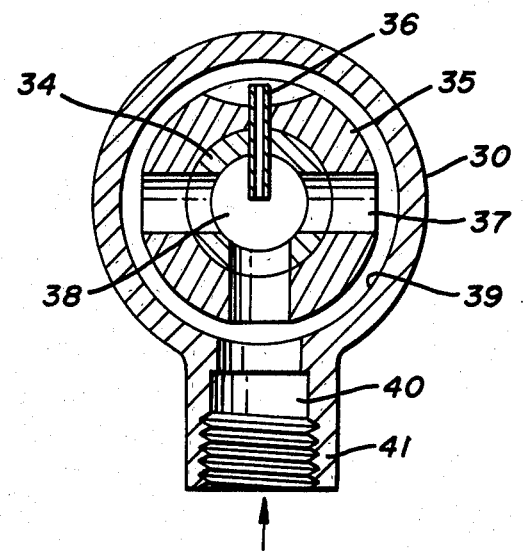
FIG. 4 is a vertical section one line 4—4 of FIG. 3.

It will occur to those skilled in the art that modifications in the invention hereinbefore disclosed can be made within the scope of the invention and one such modification may be seen in FIGS. 3 and 4 of the drawings.

By referring thereto the modification will be seen to take the form of a rotary fluid coupling such as may be used for instance in an automobile car wash wherein fluid such as water is delivered through the rotary coupling to a revolving brush or the like.

In FIG. 3 of the drawings, the rotary fluid coupling takes the form of a housing 30 having a cap 31 threadably engaged in one end thereof and in turn threadably receiving an adjustable Teflon sleeve 32. A plug 33 is positioned in the other end of the housing 30. A hollow shaft 34 extends inwardly into the housing 30 through the adjustable sleeve 32 and a sphere 35 is positioned thereon by means of a hollow pin 36 and has transverse passageways 37 therethrough communicating with the interior 38 of the hollow shaft 34. An annular enlarged channel 39 is formed in the inner wall of the housing 30 and surrounds the sphere 35 so that fluid directed into the housing 30 by way of a port 40 in a perpendicular extension 41 of the housing 30 will flow through the transverse passageways 37 directly into the interior 38 of the hollow shaft 34.

The perpendicular extension 41 is best seen in FIG. 4 of the drawings and by referring again to FIG. 3 of the drawings it will be seen that the hollow shaft 34 has a coupling 42 thereon by means of which the fluid may be directed to a desired location.

The hollow shaft 34 and the sphere 35 thereon are tensioned with respect to the plug 33 in the housing 30 by a spring 42 and a ball 43 engaged thereby, the spring being partially located in a recessed formed in the end of the otherwise hollow shaft 34. A pair of annular bearings 44 preferably formed of some slippery plastic material such as Teflon are provided for a relatively wide area contact with the sphere 35 and the exterior of the hollow shaft 34. They are positioned between the housing 30 and the cap 31 thereof and they are provided with O-rings 45 to insure their sealing action. The bearings 44 are sufficiently resilient, like the seals 28 in the form of the invention illustrated in FIG. 1 of the drawings so that they act both as bearings and fluid seals. In operating the device fluid entering through the port 40 and leaving through the coupling 42 or vice versa is continuously flowing through the rotary fluid coupling and the construction is such that there is very little wear between the parts and a long life is thereby achieved. This is particularly useful in car wash applications wherein prior art rotary fluid couplings have had a very short life and required replacement frequently.

It will be understood by those skilled in the art that the hydraulic boring device as hereinbefore described and illustrated in FIGS. 1 and 2 of the drawings is particularly suitable for drilling openings for water lines and the like from dwelling house basements for example to pits or trenches in which a main water supply line may be located and which may be some distance from the dwelling house basement. The modification of the invention forming a most efficient rotary fluid seal is partcularly suitable for applications in which wash water or rinse water or the like is directed to rotary brushes in car wash applications.

Although but two embodiments of the present invention have been illustrated and described it will be apparent to those skilled in the art that various changes and modifications may be made therein without departing from the spirit of the invention and having thus described my invention what I claim is.

1. A rotary fluid coupling comprising a cylindrical housing, a cap in one end of said housing, a hollow shaft disposed in said housing, said shaft extending outwardly of at least one end of said housing, a port in one side of said housing, an annular channel in said housing communicating with said port, a sphere positioned on said shaft in the area of said annular channel, passageways in said shaft and sphere establishing communication between said hollow shaft and said annular channel in said housing and annular sealing members formed of slippery plastic material positioned in said housing and engaged on opposite sides of said sphere adjacent said shaft and on portions of said shaft adjacent said sphere, a substantially large sealing sleeve formed of slippery plastic material engaged on a substantially large area of said shaft and abutting one of said annular sealing members and adjustably engaged in said cap, said sealing members engaging said housing and said cap respectively, said sealing members and sealing sleeve rotatably supporting, positioning and sealing said hollow shaft and sphere relative to said housing and cap.

2. The rotatable fluid coupling set forth in claim 1 and wherein the hollow shaft terminates inwardly of one end of said housing, a plug is disposed in said end of said housing and tensioning means is disposed between said plug and said hollow shaft.

3. The rotatable fluid coupling set forth in claim 1 and wherein said cap is apertured and said hollow shaft extends outwardly of both ends of said housing, said sealing sleeve is positioned in said aperture in said cap and wherein one end of said hollow shaft is closed.

4. The rotary fluid coupling set forth in claim 1 and wherein the sphere is a round member having a transverse passageway therethrough enabling said hollow shaft to be positioned therethrough and wherein a hollow pin extends transversely of said sphere and said hollow shaft so as to secure said sphere to said hollow shaft and form a secondary passageway in said shaft and sphere communicating with said hollow shaft.

* * * * *